US007497649B2

(12) United States Patent
Zhong

(10) Patent No.: US 7,497,649 B2
(45) Date of Patent: Mar. 3, 2009

(54) ROUTER

(75) Inventor: Hongfeng Zhong, Suzhou (CN)

(73) Assignee: Positec Power Tools (Suzhou) Co. Ltd., Jiangsu (CN)

( * ) Notice: Subject to any disclaimer, the term of this patent is extended or adjusted under 35 U.S.C. 154(b) by 0 days.

(21) Appl. No.: 11/627,339

(22) Filed: Jan. 25, 2007

(65) Prior Publication Data

US 2007/0169847 A1 Jul. 26, 2007

(30) Foreign Application Priority Data

Jan. 26, 2006 (CN) .................... 2006 1 0008496.2

(51) Int. Cl.
*B23C 1/00* (2006.01)
*B27C 1/00* (2006.01)

(52) U.S. Cl. .................................. 409/182; 144/136.95

(58) Field of Classification Search ................. 409/175, 409/176, 177, 178, 179, 180, 181, 182, 210, 409/214, 218; 144/136.95, 154.5
See application file for complete search history.

(56) References Cited

U.S. PATENT DOCUMENTS 4,272,821 A 6/1981 Bradus
5,074,724 A * 12/1991 McCracken ................. 409/182
5,078,557 A 1/1992 McCracken
5,094,575 A * 3/1992 Kieser et al. ................ 409/182
5,725,036 A * 3/1998 Walter ........................ 409/182
6,474,378 B1 * 11/2002 Ryan et al. .................. 409/182
6,896,451 B2 * 5/2005 Oberheim ................... 409/182
7,022,924 B2 * 4/2006 Patton ........................ 409/182
7,281,887 B2 * 10/2007 Taylor ........................ 409/182
2004/0005201 A1 * 1/2004 Tomayko .................... 409/131
2004/0052600 A1 * 3/2004 Pientka et al. ............. 409/182
2005/0079025 A1 4/2005 Oberheim
2006/0045643 A1 * 3/2006 Petersen ..................... 409/182
2006/0118205 A1 * 6/2006 McDonald et al. .......... 409/182
2006/0249227 A1 * 11/2006 McDonald et al. .......... 409/182
2006/0269377 A1 * 11/2006 Onose et al. ................ 409/182

* cited by examiner

*Primary Examiner*—Dana Ross

(57) ABSTRACT

A fixed base router has a base supporting an upright wall. A motor based driver assembly is received in a cylindrical interior space delimited by the wall and movable along a spiral path. A read-out system includes a position sensor that detects and applies the displacement of the driver assembly along the spiral path to a processor based circuit, which in turn generates a signal indicating the displacement and a display device showing up the displacement for visual inspection. The read-out system allows for precise positioning the driver assembly and thus setting a cutting depth of a tool bit carried on and driven by the driver assembly so that adjustment of positioning of the tool bit is made simple, readable and precise.

14 Claims, 11 Drawing Sheets

ROUTER

BACKGROUND OF THE INVENTION

1. Field of the Invention

The present invention relates generally to a router, and more particularly, to a fixed base router which comprises a digital read-out system.

2. The Related Arts

Router is a power tool used to cut a workpiece for forming grooves, edges and a variety of shapes of the workpiece. A router that, in a cutting operation, maintains a fixed position of a tool bit thereof with respect to a workpiece is generally referred to as a "fixed base router". The fixed base router allows manual movement of the tool bit toward and/or away from the workpiece in accordance with the required depth of cutting. However, obtaining a desired cutting depth is a time consuming task for it generally involves a trial and error process where a user cuts a sample of stock, measures the resulting cutting depth, and then attempts to make the appropriate corrective adjustment. This process is generally repeated several times before the desired cutting depth is obtained. Thus, the adjustment is in fact cumbersome and time-consuming.

The present invention is made to overcome the inefficiency of trial-and-error process used to obtain a desired cutting depth in a conventional router.

SUMMARY OF THE INVENTION

The primary object of the present invention is to provide a fixed base router comprising a read-out system to precisely display the cutting depth of a tool bit.

In accordance with the present invention, a fixed base router is provided, comprising a base supporting an upright wall. A motor based driver assembly is received in a cylindrical interior space delimited by the wall and is movable along a spiral path. A read-out system comprises a position sensor that detects and applies the displacement of the driver assembly along the spiral path to a processor based circuit, which in turn generates a signal indicating the displacement and a display device showing up the displacement for visual inspection.

The router in accordance with the present invention comprises the read-out system that allows for precise positioning the driver assembly and thus setting a cutting depth of a tool bit carried on and driven by the driver assembly so that adjustment of positioning of the tool bit is made simple, readable and precise.

BRIEF DESCRIPTION OF THE DRAWING

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
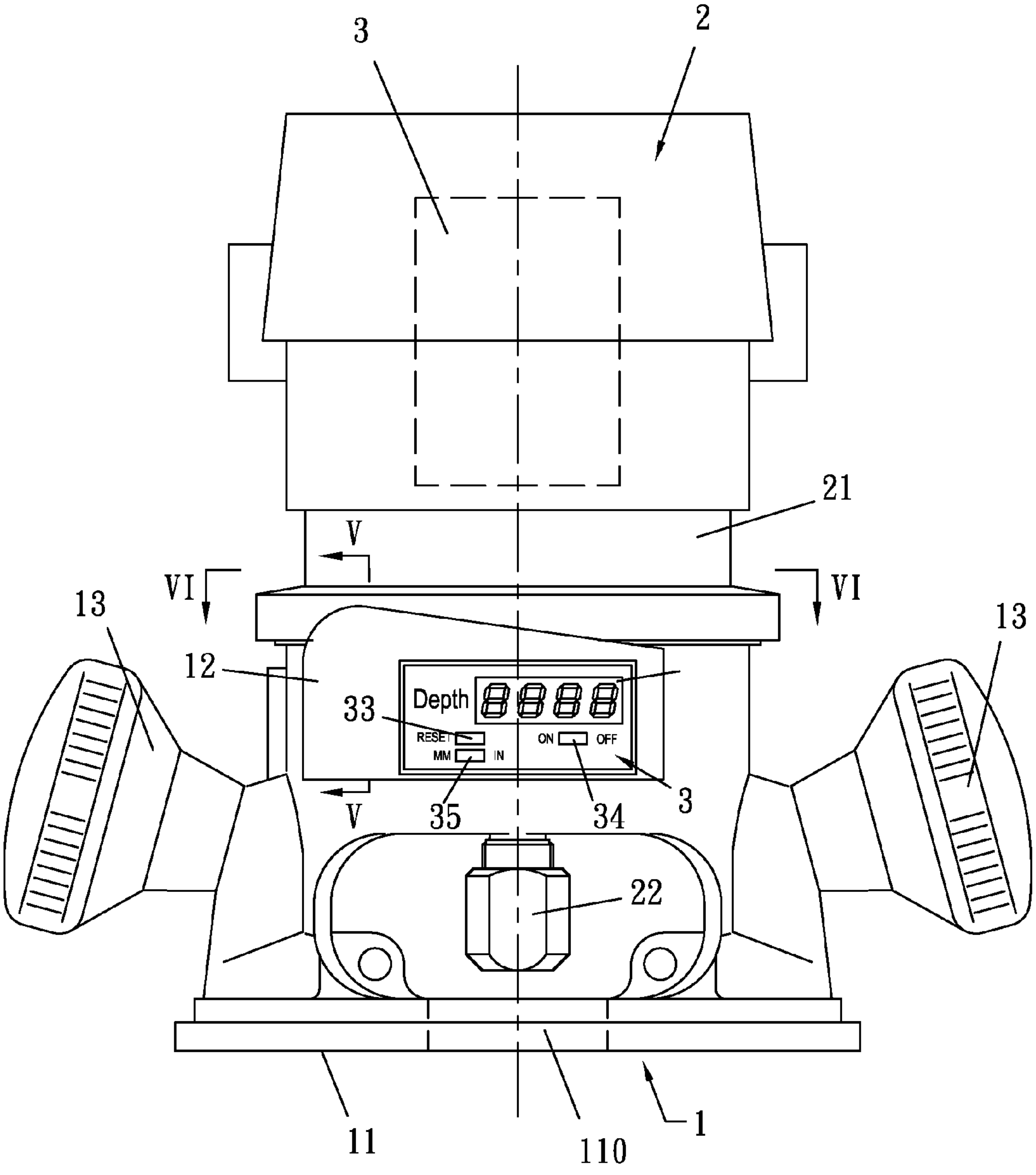
FIG. 1 is a front view of a router constructed in accordance with a preferred embodiment of the present invention.
Figure 2:
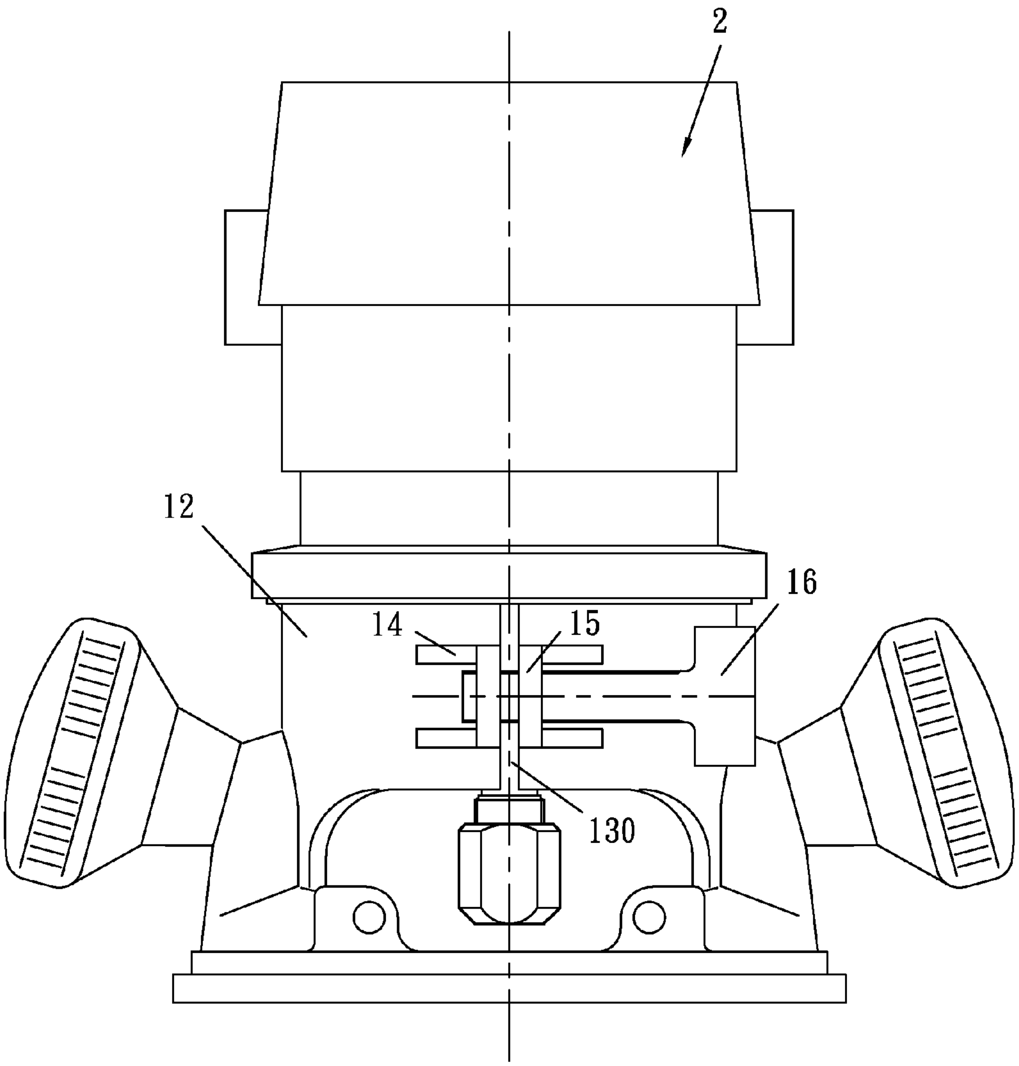
FIG. 2 is a back view of the router illustrated in FIG. 1.

With reference to the drawings and in particular to FIGS. 1 and 2, a fixed base router is illustrated as an example for describing the present invention. The router comprises a base assembly 1, a driver assembly 2 that is moveably mounted on the base assembly 1 and carrying therein a power driver device, such as a drive motor 23 (shown in dashed lines in FIG. 1) that powers a tool bit 22 for machining a workpiece (not shown), and a read-out system 3 that is supported on the base assembly 1. Alternatively, the read-out system 3 may be mounted on the driver assembly 2.

The base assembly 1 comprises a generally planar support plate 11 in which an opening or a hole 110 is defined for the selective extension of the tool bit 22 of the driver assembly 2. A surrounding wall 12 extends from the support plate 11 in an axial direction toward the driver assembly 2, defining a hollow, cylindrical interior (not labeled) in which the driver assembly 2 is movably and rotatably received. Preferably, two handles 13 are mounted on the wall 12. The surrounding wall 12 is split with an elongate opening 130 formed between two opposed ends and two brackets 14 and 15 each having a tapped hole (not shown) are respectively formed on the opposed ends of the wall 12 adjacent to the opening 130. A bolt 16 engages with and extends through both tapped holes of the brackets 14, 15 to releasably secure the wall 12 to the driver assembly 2 so as to maintain the position of the driver assembly 2 relative to the base assembly 1.

The driver assembly 2 comprises a generally cylindrical housing 21 in which the drive motor 23 is fixed. The drive motor 23 has a spindle (not shown) to which the tool bit 22 is mounted. The drive motor 23 selectively drives rotation of the tool bit 22 to work on the workpiece. The cylindrical housing 21 is movably received in the interior space of the surrounding wall 12 to selectively move the motor 23 and the tool bit 22 with respect to the base assembly 1.

The read-out system 3 comprises an electrical circuit comprising a position sensor (indicated at 31*a* in FIG. 5; 31*b* in FIG. 10), a processing device (not shown), a display device 32 that comprises a liquid crystal display (LCD) in the embodiment illustrated, but may be other known displaying devices, such as a light-emitting diode (LED) based display, a reset switch 33 for resetting data displayed on the display device 32 to zero, and a mode switch 35 for switching between for example an English or Metric units read-out. The read-out system 3 is powered by for example a built-in power source, which may comprise one or more batteries, either primary or secondary, or an external AC power from an electrical main through an AC/DC power adaptor circuit.

Figure 3:
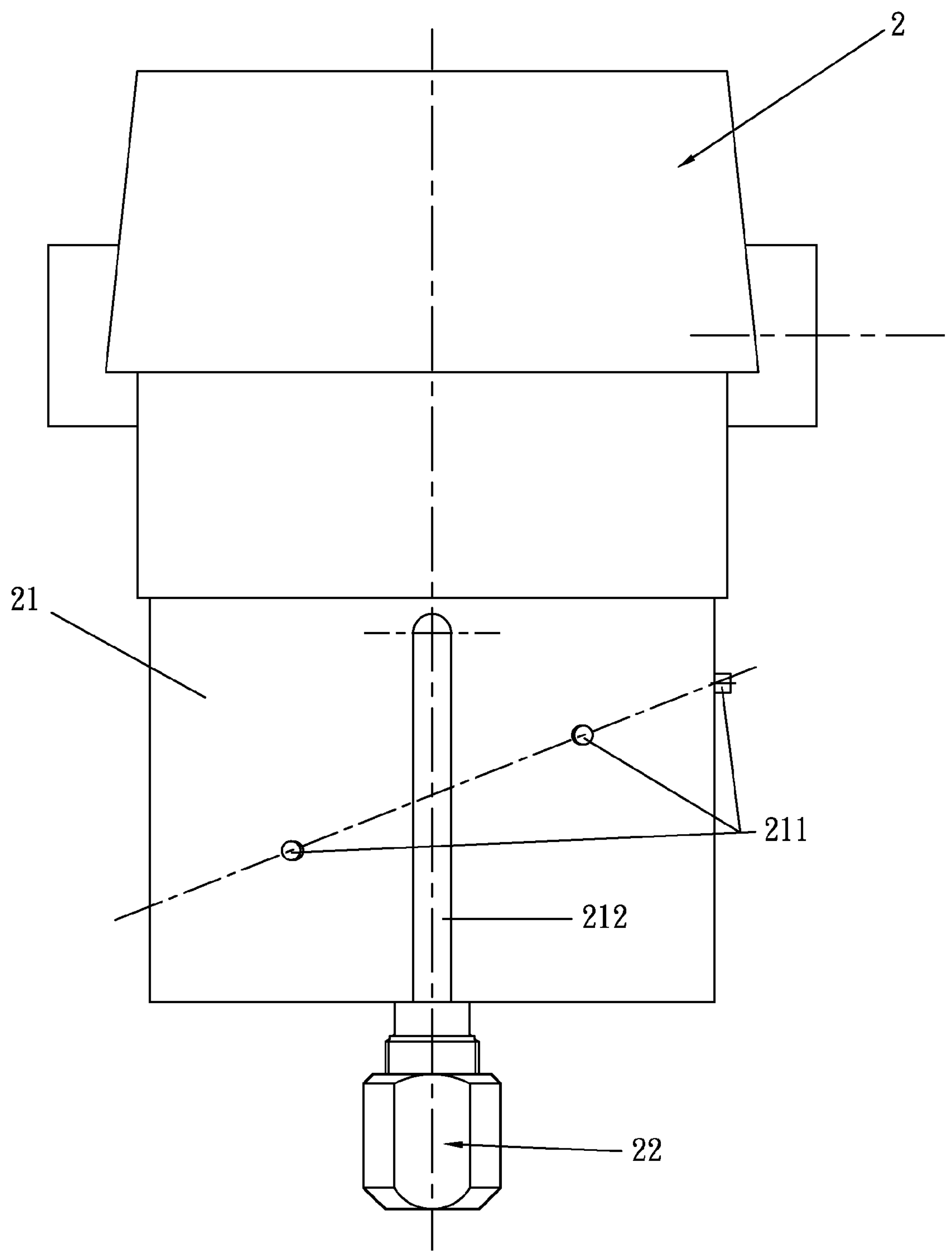
FIG. 3 is a front view of a driver assembly of the router in accordance with the present invention.

As be best shown in FIG. 3, an outer circumference of the cylindrical housing 21 is formed with a plurality of pins 211 that extends in a radial direction. A spiral groove 121 is provided in an inner surface of the surrounding wall 12 and slidably receiving the pins 211 of the housing 21 of the driver assembly 2 to guide spiral movement of the driver assembly 2 with respect to the base assembly 1. The cooperation between the pins 211 of the driver assembly 2 and the spiral groove 121 of the wall 12 of the base assembly 1 effects a camming action for conversion of rotation of the driver assembly 2 with respect to the wall 12 of the base assembly 1 into linear movement of the driver assembly 2 in the axial direction of the base assembly 1.

Apparently, other modifications and alternatives that enable the spiral movement of the driver assembly 2 with respect to the surrounding wall 12 of the base assembly 1 and that are apparent to those skilled in the art can be employed to effect the conversion between rotation and linear axial movement of the driver assembly 2. For example, the pins can be formed on the inner surface of the wall 12 of the base assembly 1 slidably received in spiral groove defined in the outer circumference of the housing 21 of the driver assembly 2. This provides the same camming action between the driver assembly 2 and the base assembly 1.

Another modification can be made as being easily anticipated by those having ordinary skills by replacing the pin 211 and the spiral groove 121 with mated external and internal threads or screws formed on the outer circumference of the cylindrical housing 21 of the driver assembly 2 and the inner surface of the surrounding wall 12 of the base assembly 1. The mated screw threads between the driver assembly 2 and the base assembly 1 effect a screw-based transmission that enables the spiral movement of the driver assembly 2 with respect to the base assembly 1, or conversion of the rotation of the driver assembly 2 into linear axial movement.

Also, a plurality of axial grooves 212 is defined in the outer circumference of the housing 21 and extends in the axial direction.

Figure 4:
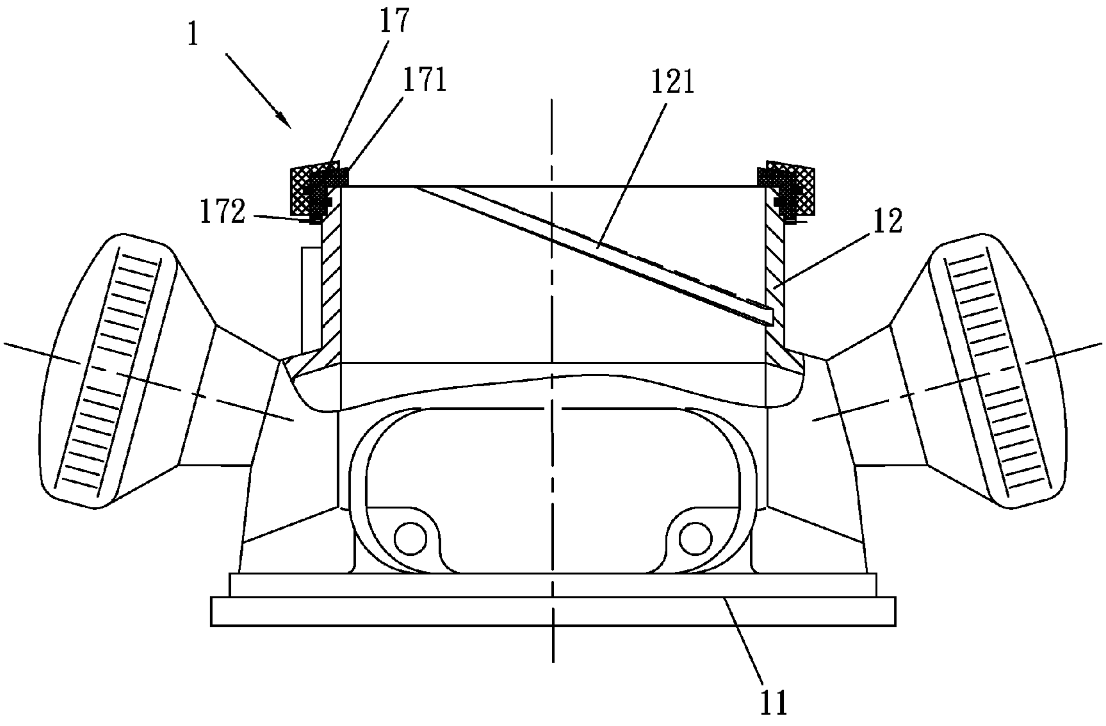
FIG. 4 is a front view, partly broken, of a base assembly of the router in accordance with the present invention.

As shown in FIG. 4, a cone gear 17 is concentrically and rotatably mounted to the surrounding wall 12 of the base assembly 1 and provides a cylindrical bore (not labeled) sufficient to receive the driver assembly 2 therethrough. The cone gear 17 forms a plurality of protrusions 171 that is inward extended to respectively engage with the axial grooves 212 defined in the housing 21 of the driver assembly 2 so as to rotatably fix the cone gear 17 to the housing 21 of the driver assembly 2. In other words, the cone gear 17 rotates in unison with the driver assembly 2.

Figure 5:
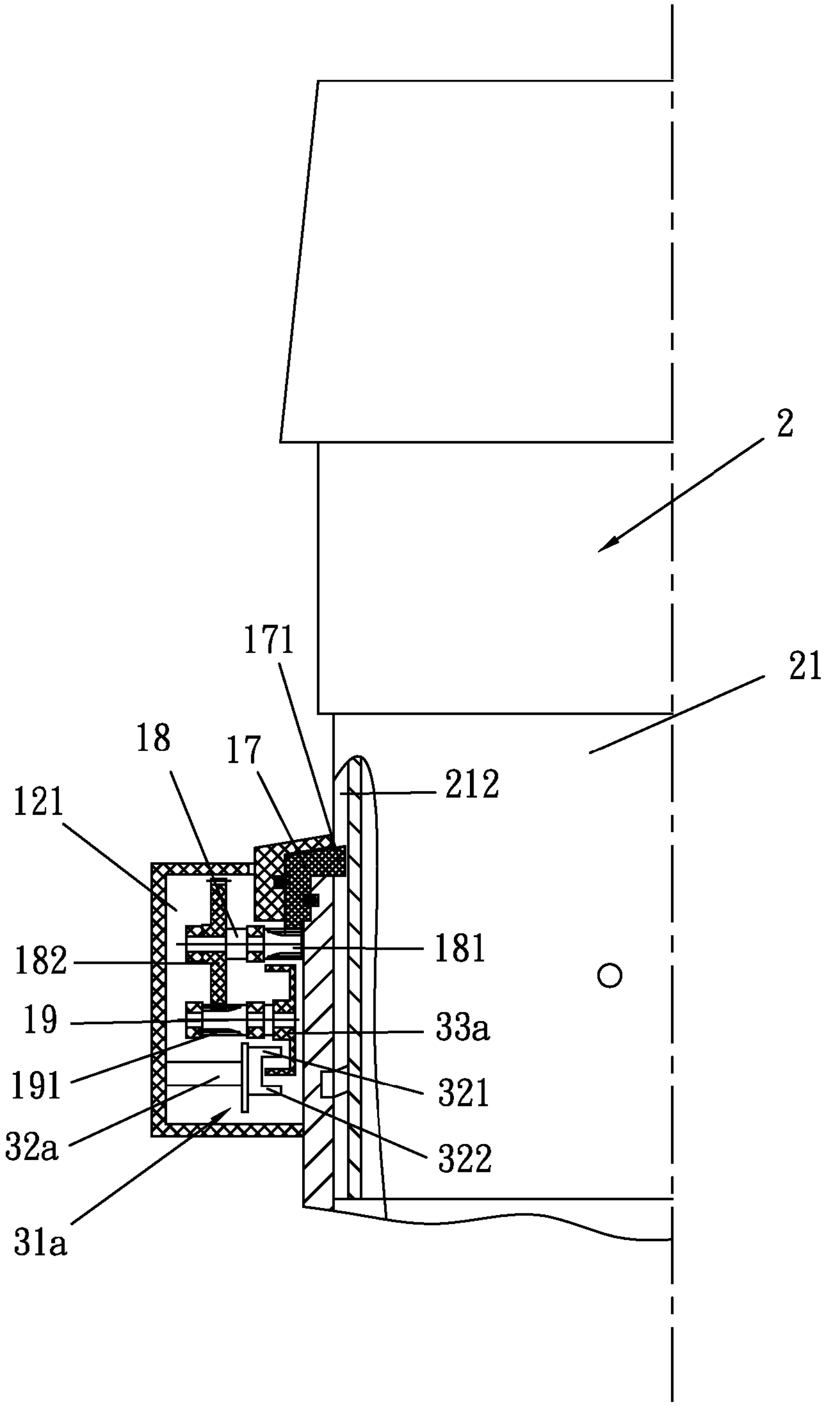
FIG. 5 is a partly cross-section view taken along the line V-V of FIG. 1.
Figure 6:
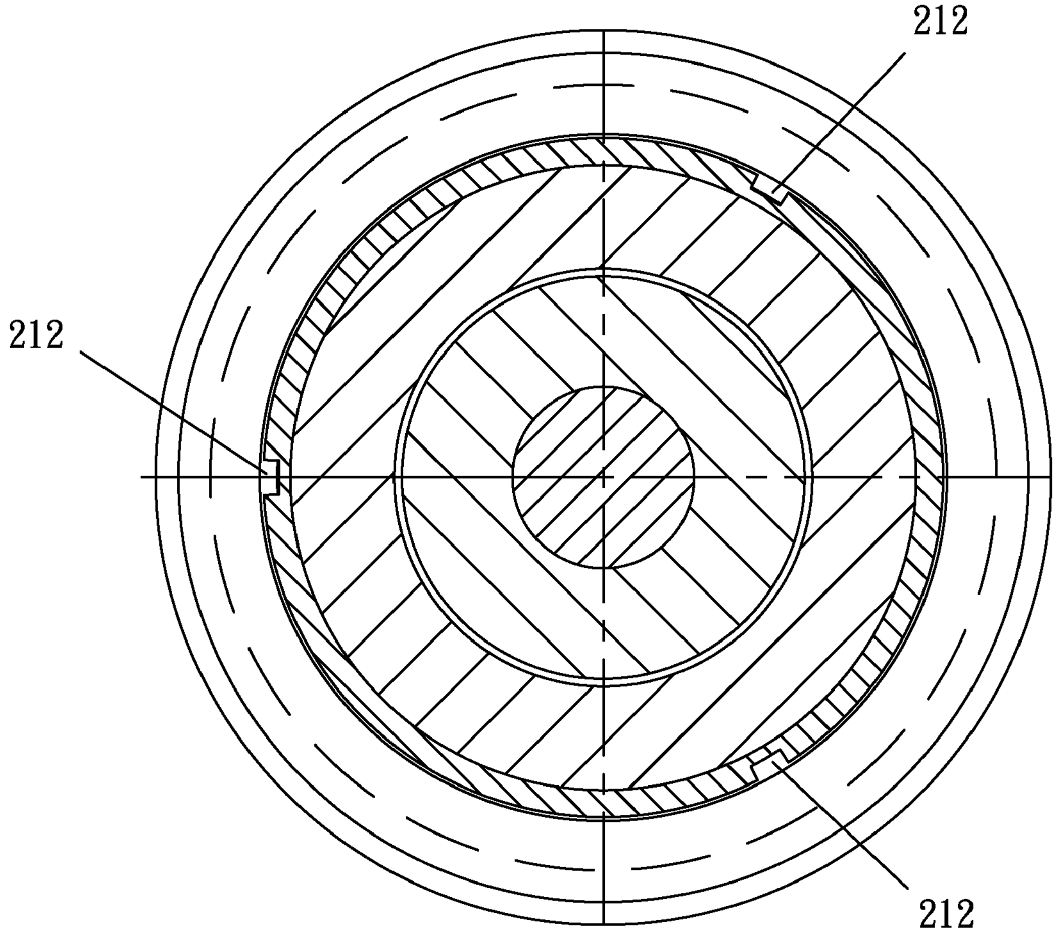
FIG. 6 is a cross-section view taken along the line VI-VI of FIG. 1.

Also referring to FIGS. 5 and 6, the position sensor 31*a* of the read-out system 3 comprises an encoding disk 33*a* that is in driving coupling with the housing 21 of the driver assembly 2, which will be further described, and a counter 32*a* fixed to the surrounding wall 12 of the base assembly 1. The position sensor 31*a* as illustrated in the embodiment of FIGS. 5 and 6 serve to detect rotation (angular displacement) of the driver assembly 2 when the driver assembly 2 carries out the spiral movement with respect to the surrounding wall 12 of the base assembly 1. In this respect, a transmission system is provided between the housing 21 of the driver assembly 2 and the encoding disk 33*a*, which comprises the cone gear 17 and a gear train embodied in the form of toothed shafts 18, 19. The first shaft 18 forms a pinion 181 mating the cone gear 17 and a gear 182. The second shaft 19 forms a gear 191 mating the gear 182 of the first shaft 18 and is rotatably fixed to the encoding disk 33*a* by having a shaped end fit into a corresponding shaped bore 331*a* defined in the encoding disk 33*a*. Thus, the rotation of the housing 21 of the driver assembly 2 is transmitted through the cone gear 17 and the first and second shafts 18, 19 to the encoding disk 33*a* that is rotatable in unison with the second shaft 19.

The base assembly 1 is provided with a chamber 121 in which the gear shafts 18, 19 and gears 182, 191 and the pinion 181, as well as the encoding disk 33*a* are accommodated.

Figure 7:
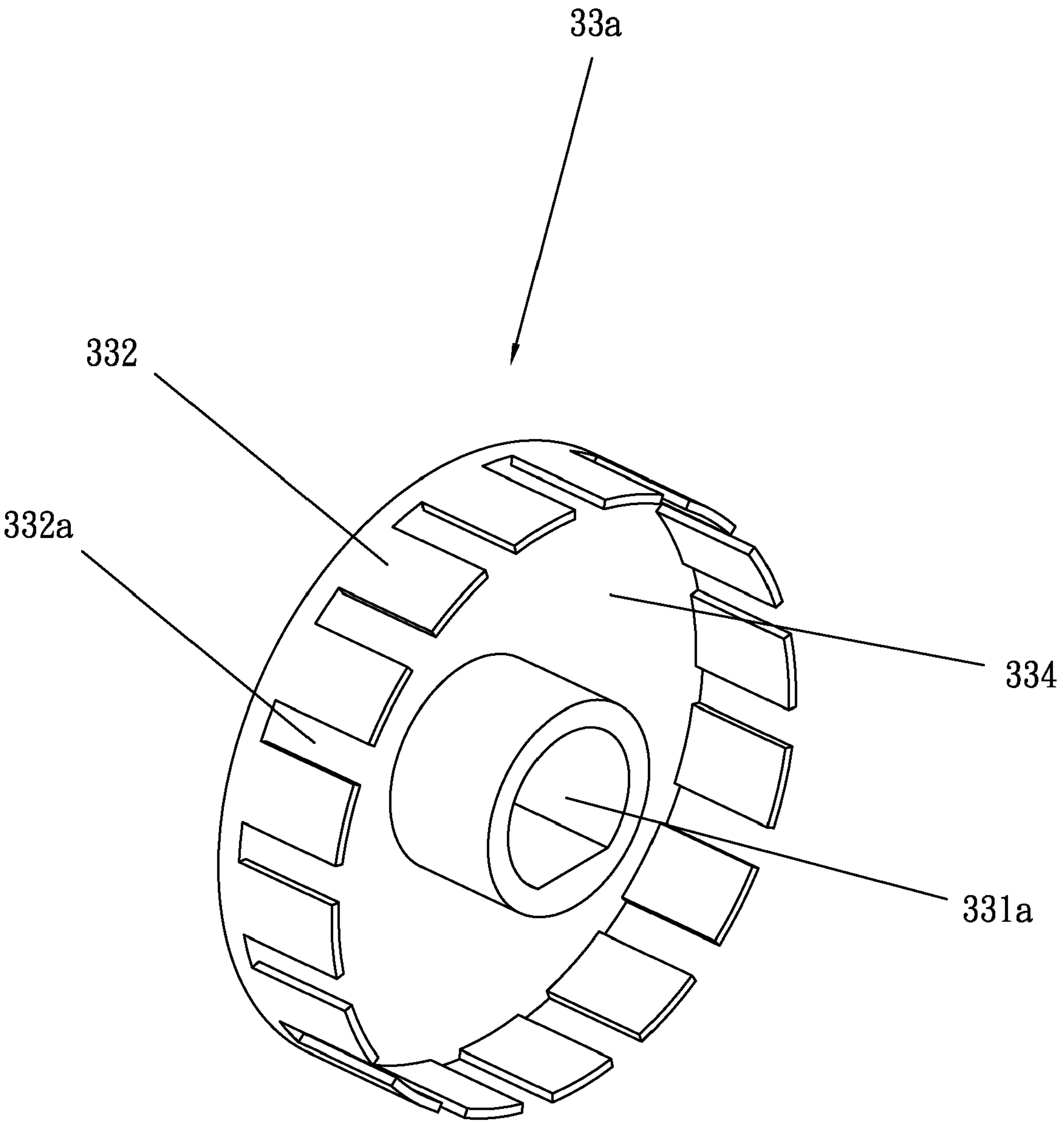
FIG. 7 is a perspective view of an encoding disk consisting a position sensor of the router in accordance with the present invention.

In an aspect of the present invention, the counter 32*a* comprises an optical switch which comprises a light transmitter 321 and a light receiver 322. Referring to FIG. 7, the encoding disk 33*a* comprises a disc plate 334 in which the bore 331*a* is formed for receiving the second shaft 19 and a cylindrical wall 335 extending from the disc plate 334. A plurality of through holes or notches 332*a* is defined in the cylindrical wall 335 and is equally spaced along a circumference of the wall 335. The light transmitter 321 and the light receiver 322 are respectively located on opposite sides of the wall 335 whereby rotation of the encoding disk 33*a* causes the notches 332*a* to sequentially pass between the light transmitter 321 and the light receiver 322. Consequently, the light receiver 322 repeatedly receives a light emitted from the light transmitter and pulse-like signal is induced. Thus, an angular displacement of the encoding disk 33*a* can be calculated based on the counts of the pulses indicating that the light receiver 322 detects light from the light transmitter 321.

When the driver assembly 2 is manually rotated to effect adjustment of position thereof with respect to the base assembly 1, an angular displacement induced by the rotation of the driver assembly 2 is transmitted through the cone gear 17 and the shafts 18, 19 to the encoding disk 33*a*. Based on the angular displacement of the encoding disk 33*a* determined by counter 32*a*, the angular displacement of the driver assembly 2 can be determined because the ratio of angular displacement between the driver assembly 2 and the encoding disk 33*a* is set by the geometrical data of the cone gear 17, the gears and pinions of the shafts 18, 19 and the spacing of the notches 332*a* of the encoding disk 33*a*. The angular displacement of the driver assembly 2 is then converted into linear axial displacement based on the geometric data of the pins 211 and the spiral groove 121, or those of mated screws between the driver assembly 2 and the base assembly 1. All these are processed by the processing device that receives data from the counter 331, calculates the movement and generates a position signal that is fed to and displayed on the display device 32.

Figure 8:
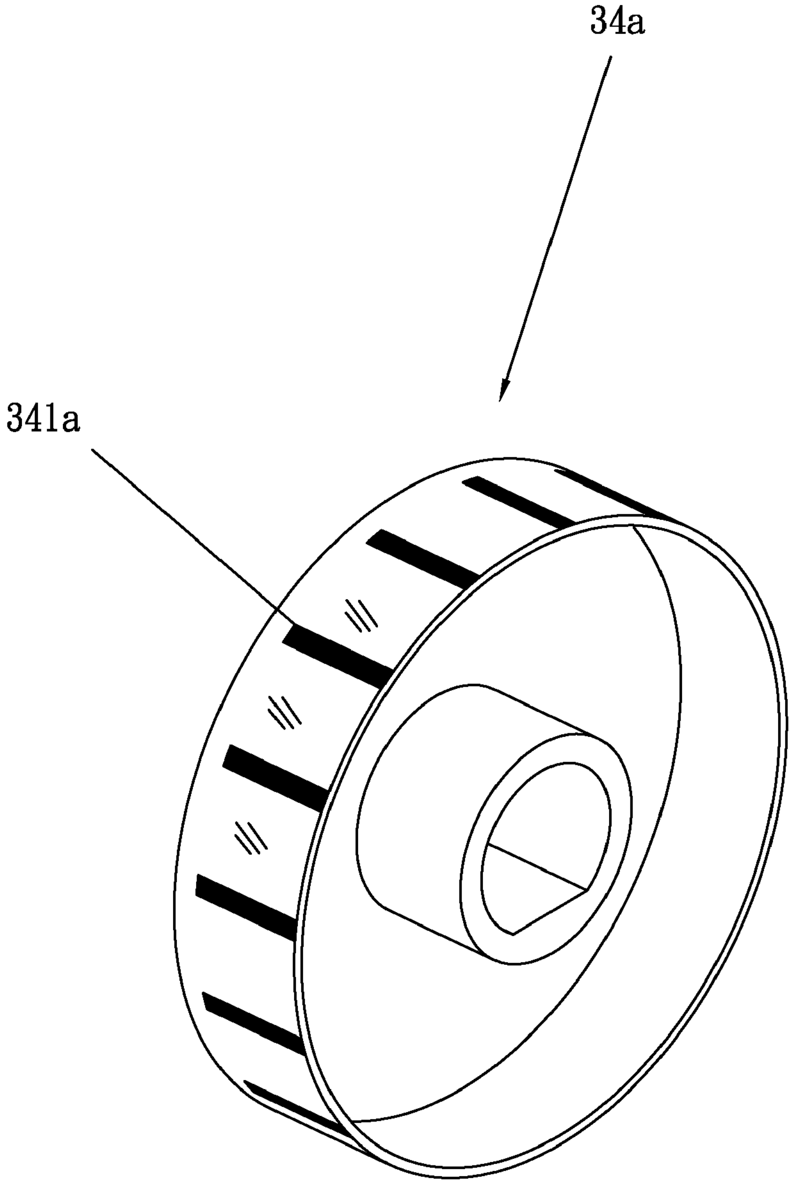
FIG. 8 is a perspective view of another encoding disk consisting the position sensor of the router in accordance with the present invention.
Figure 9:
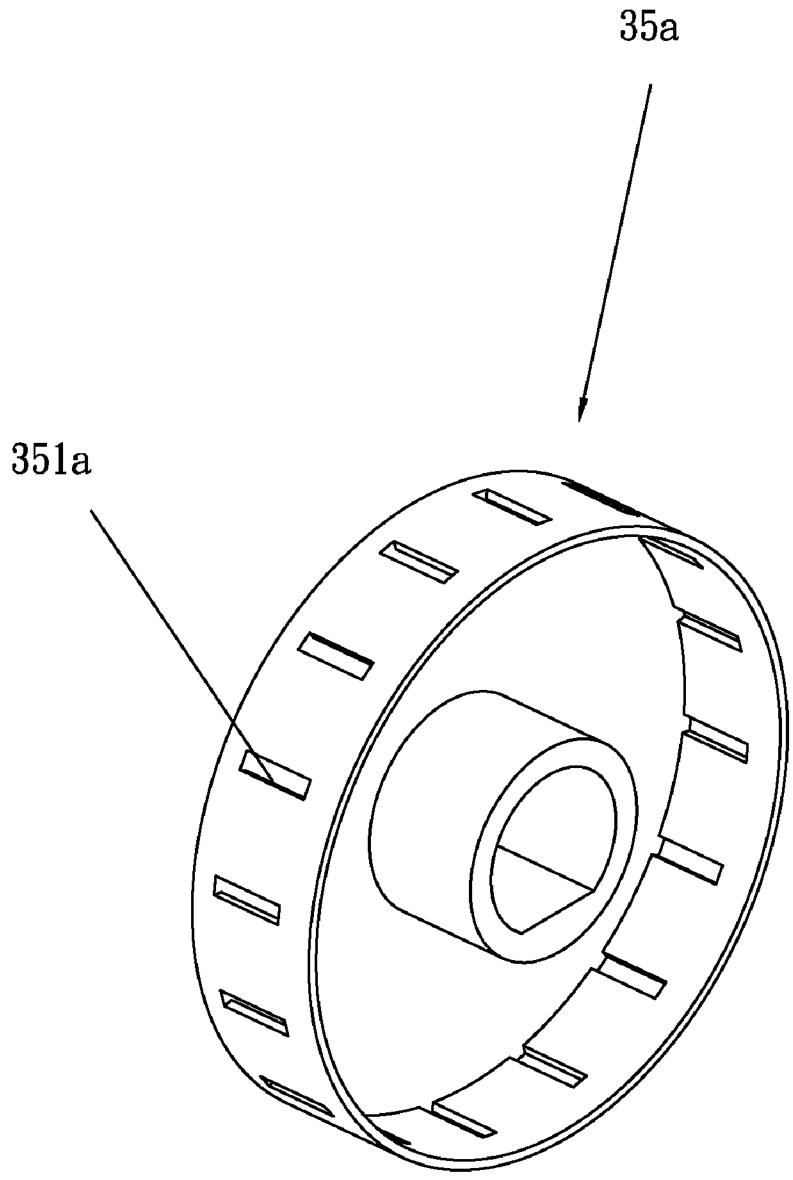
FIG. 9 is a perspective view of a further encoding disk consisting the position sensor of the router in accordance with the present invention.

In another aspect of the present invention, the encoding disk, which is designated with reference numeral 34*a* for distinction, is made transparent and comprises a plurality of opacity sections 341*a* equally-spaced around the wall of the encoding disk 34*a*, as shown FIG. 8. The opacity sections 341*a* serves to block the transmission of the light from the light transmitter to the light receives in a regular manner whereby counts of detection of light by the light receiver can be based to determine the angular displacement of the driver assembly 2. In a further aspect, the counter 32*a* is embodied as a Hall sensor, and corresponding thereto, the encoding plate, which is designated with reference numeral 35*a*, comprises a plurality of magnets 351*a* attached to the wall of the encoding disk 35*a* in a circumferentially equally-spaced manner, as shown in FIG. 9.

Figure 10:
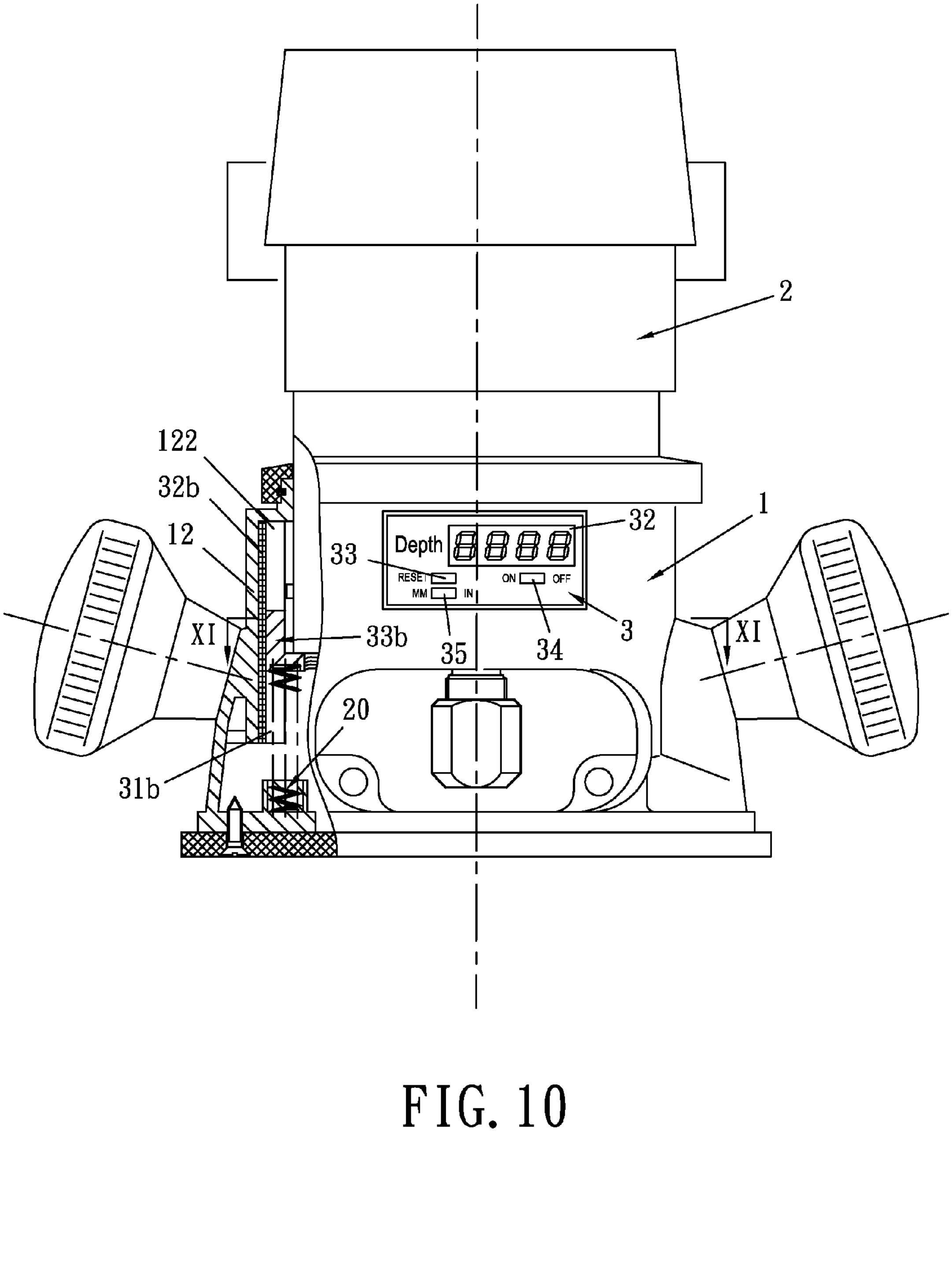
FIG. 10 is a front view, partly broken, of a router constructed in accordance with another embodiment of the present invention.
Figure 11:
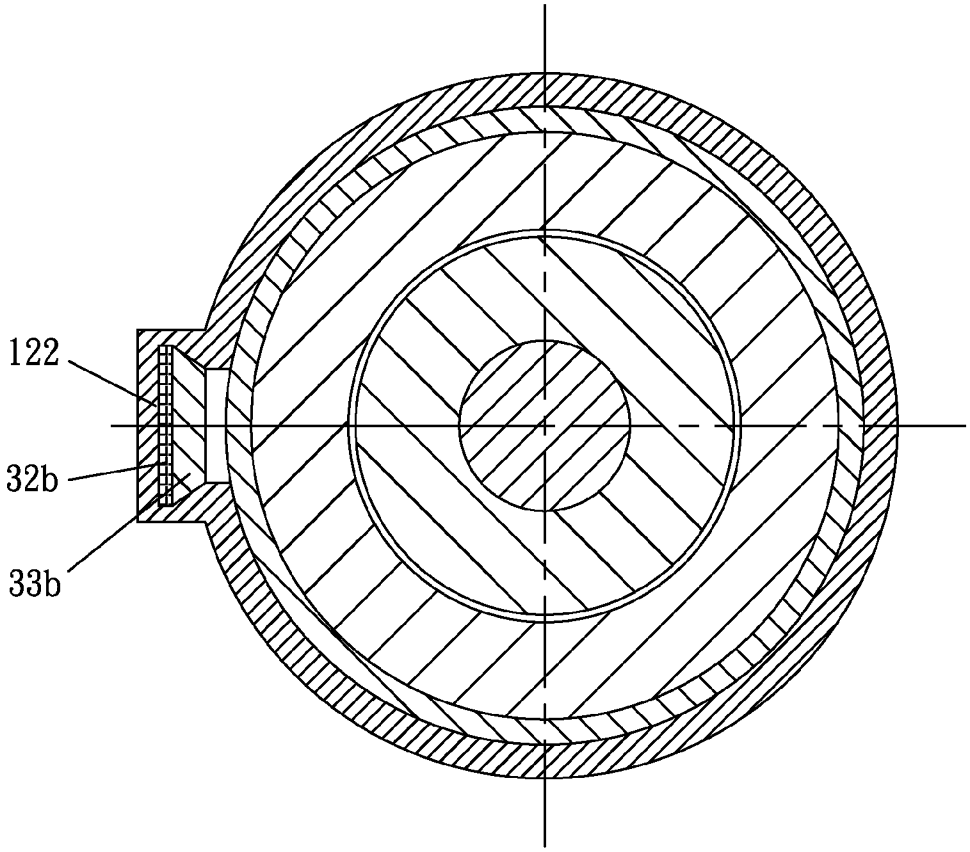
FIG. 11 is a cross-section view taken along the line XI-XI of FIG. 10.

Referring to FIGS. 10 and 11, a router constructed in accordance with another embodiment of the present invention is shown. In the router, a position sensor that is designated at 31*b* is provided to detect linear axial displacement of the driver assembly 2 when the driver assembly 2 is subject to spiral movement with respect to the base assembly 1. The router comprises an axially-extending V-shaped channel 122 formed in the inner circumference of the surrounding wall 12 of the base assembly 1. The position sensor 31*b* comprises a capacitance transducer comprising a fixed sensor rail 32*b* fixedly mounted in the V-shaped channel 122, and a movable sensor element 33*b* moveably received in the V-shaped channel 122 adjacent to the fixed sensor rail 32*b* and biased by a biasing member 20 against the driver assembly 2. (For example, the sensor element 33*b* has a projection (not labeled) put in abutting engagement with the cylindrical housing 21 of the driver assembly 2 by the biasing force of the biasing member 20.) The sensor element 33*b* is movable with respect to the V-shaped channel 122 and thus the wall 12 of the base assembly 1 in a linear and axial movable manner.

When the driver assembly 2 is manually operated to take a spiral movement for moving away from or toward the support plate 11 of the base assembly 1, the movable sensor element 33*b*, under the biasing force of the basing member 20, is moved with the driver assembly 2. For example, when the driver assembly 2 is moved upward, the sensor element 33*b* is biased upward by the biasing member 20 (with the biasing member 20 extending) to follow the driver assembly 2 and when the driver assembly 2 is moved downward, the sensor element 33*b* is driven downward by the driver assembly 2 against the biasing member 20 (so that the biasing member 20 is compressed). The relative movement of the movable sensor element 33*b* with respect to the fixed sensor rail 32*b* is thus detected and signal associated with the relative movement is transmitted to the processing device whereby the processing device converts the signal, which represents data of movement, into a position signal fed to and displayed on the display device 32.

To carry out adjustment of cutting depth in a workpiece, an operator manipulates the power switch 34 of the read-out system 3, releases the bolt 16 and manually rotates the driver assembly 2 to make the driver assembly 2 moving in a spiral fashion with respect to the base assembly 1. When the tool bit 22 that is carried by the driver assembly 2 gets into contact with the workpiece, the operator manipulates the reset switch 33 to reset the display device 32 to zero. Thereafter, the router is actuated to have the driver assembly 2 moving the tool bit 22 through the extending the hole 110 defined in the support plate 11 of the base assembly 1. The position sensor detects angular displacement or axial displacement of the spiral movement of the driver assembly 2 with respect to the wall 12 of the base assembly 1, and data associated with the detected displacement is transmitted to the processing device. The processing device converts the detected displacements into a position signal that is fed to and displayed on the display device 32 for visual inspection of the cutting depth set by the operator. When the desired depth is achieved, the operator secures the bolt 16 to maintain the position of the driver assembly 2 with respect to the base assembly 1.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A fixed base router comprising:

a base assembly comprising a wall delimiting a cylindrical interior space;

a driver assembly rotatably and movably received in the cylindrical interior space of the wall, the driver assembly being movable along a spirally extending path with respect to the wall of the base assembly to induce a spiral displacement comprising an angular component and an axial linear component; and a read-out system comprising a position sensor that detects and processes the angular component of the spiral displacement between the driver assembly and the base assembly to generate a position signal indicating a position of the driver assembly with respect to the base assembly.

2. The fixed base router as claimed in claim 1, wherein the read-out system comprises a processor based circuit that receives and processes data associated with the angular component of the spiral displacement between the driver assembly and the base assembly to generate the position signal.

3. The fixed base router as claimed in claim 1, wherein the spirally extending path is defined by a spiral groove defined in one of the base assembly and the driver assembly to slidably receive and spirally guide at least one pin provided on the other one of the base assembly and the driver assembly.

4. The fixed base router as claimed in claim 1, wherein the spirally extending path sets a relationship between the axial linear component and the angular component of the spiral displacement.

5. The fixed base router as claimed in claim 4, wherein the position sensor comprises an encoding disk is driven by the driver assembly in a predetermined rotatable coupling and a counter fixed to the base assembly, a relative movement being established between the counter and the encoding disk to carry out counting and determining the rotation of the encoding disk based on the counting.

6. The fixed base router as claimed in claim 5, wherein the counter comprises an optical switch, and wherein the encoding disk comprises a plurality of through holes that are distributed in an equally spaced manner, light being arranged to travel through the holes to generate the pulses.

7. The fixed base router as claimed in claim 5, wherein the counter comprises an optical switch, and wherein the encoding disk is transparent and comprises a plurality of opacity sections that are distributed in an equally spaced manner, light being arranged to travel through the encoding disk and regularly blocked by the opacity sections to generate the pulses.

8. The fixed base router as claimed in claim 5, wherein the counter comprises a Hall sensor, and wherein the encoding disk comprises a plurality of magnets that are distributed in an equally spaced manner to be regularly detected by the Hall sensor to generate the pulses.

9. The fixed base router as claimed in claim 5, wherein the rotatable coupling between the driver assembly and the encoding disk comprises a gear train comprising at least two meshed gears for driving the rotation of the encoding disk.

10. The fixed base router as claimed in claim 9, wherein one of the meshed gears comprises a cone gear having a central bore receiving the driver assembly therein and is rotatable in unison with the driver assembly.

11. A fixed base router comprising:

a base assembly comprising a wall delimiting a cylindrical interior space;

a driver assembly rotatably and movably received in the cylindrical interior space of the wall, the driver assembly being movable along a spirally extending path with respect to the wall of the base assembly to induce a spiral displacement comprising an angular component and an axial linear component, the spirally extending path setting a relationship between the axial linear component and the angular component of the spiral displacement; and a read-out system comprising a position sensor that detects and processes the axial linear component of the spiral displacement between the driver assembly and the base assembly to generate a position signal indicating a position of the driver assembly with respect to the base assembly.

12. The fixed base router as claimed in claim 11, wherein the position sensor comprises a capacitance transducer comprising a fixed sensor rail fixedly mounted to the base assembly and a movable sensor element movable in unison with the driver assembly.

13. The fixed base router as claimed in claim 11, wherein the read-out system comprises a processor based circuit that receives and processes data associated with the axial linear component of the spiral displacement between the driver assembly and the base assembly to generate the position signal.

14. The fixed base router as claimed in claim 11, wherein the spirally extending path is defined by a spiral groove defined in one of the base assembly and the driver assembly to slidably receive and spirally guide at least one pin provided on the other one of the base assembly and the driver assembly.

* * * * *